UNITED STATES PATENT OFFICE.

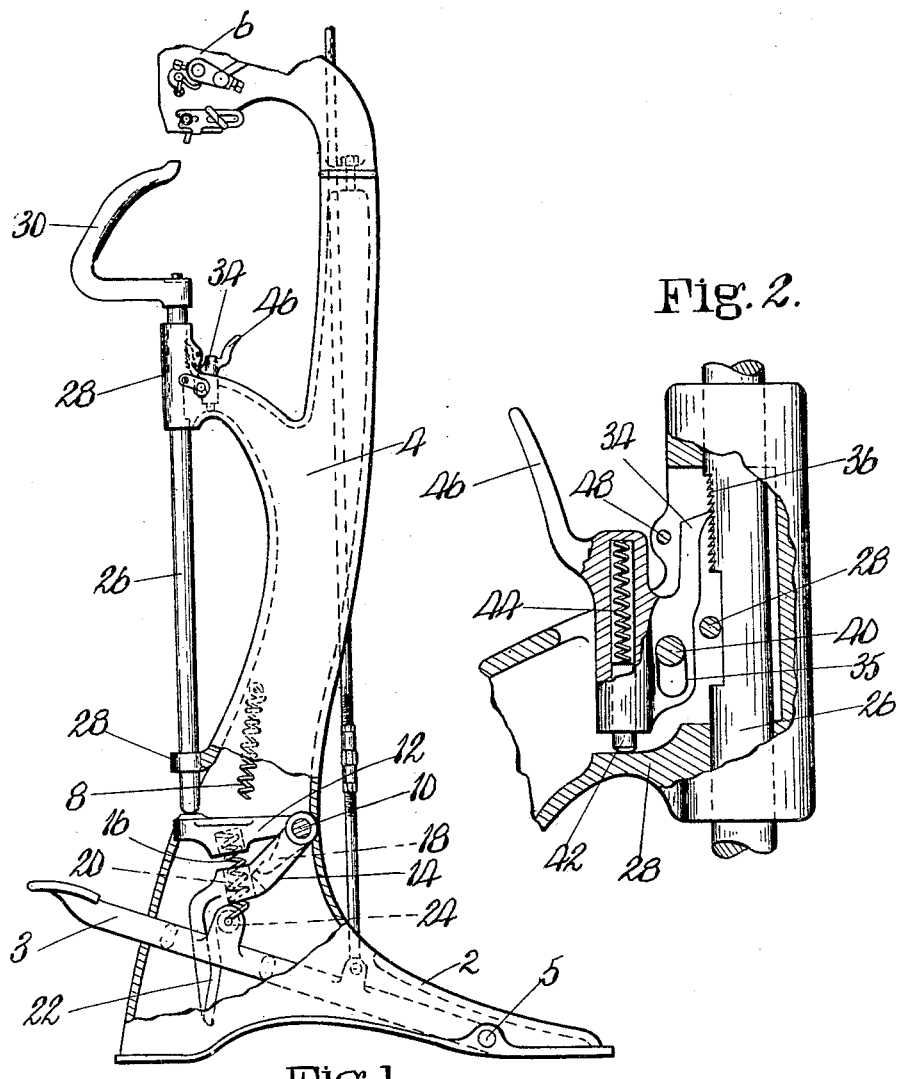

GEORGE GODDU, OF WINCHESTER, MASSACHUSETTS, ASSIGNOR TO UNITED SHOE MACHINERY COMPANY, OF PATERSON, NEW JERSEY, A CORPORATION OF NEW JERSEY.

WORK-SUPPORT.

1,117,183.  Specification of Letters Patent.  Patented Nov. 17, 1914.

Original application filed April 5, 1909, Serial No. 488,031. Divided and this application filed March 12, 1912. Serial No. 683,232.

*To all whom it may concern:*

Be it known that I, GEORGE GODDU, a citizen of the United States, residing at Winchester, in the county of Middlesex and State of Massachusetts, have invented certain Improvements in Work-Supports, of which the following description, in connection with the accompanying drawings, is a specification, life reference characters on the drawings indicating like parts in the several figures.

This invention relates to mechanisms for controlling the operation of work supports, the invention being especially applicable to work supports of the type employed in manually operated machines for inserting fastenings wherein a single treadle serves both to effect relative movement of the work support and the machine head into work clamping relation to each other and the raising and release of the driver for the fastening inserting operation.

An important feature of the invention is the provision in a manually operated machine for inserting fastenings of a novel work release to permit the feeding of the work between successive fastening inserting operations, said machine being so constructed that the release of the work for the feeding operation is less than the release to permit the removal of the work and likewise less than the initial clamping movement.

In its illustrated embodiment this feature of the invention comprises a work support movable between work receiving and work clamping positions and means for automatically preventing the return of said support beyond a point intermediate between said positions after the initial movement into work clamping position, said means being constructed to permit a limited reciprocating movement of said support and being preferably arranged to be manually released when the insertion of fastenings has been completed.

Another feature of the invention is the provision of means for automatically preventing the return of the work support which adjusts itself automatically to the thickness of the work.

Other features of the invention will be apparent when the following description and claims are considered in connection with the accompanying drawings, in which,—

Figure 1 is a side elevation of a portion of a fastening inserting machine embodying this invention, a portion of one of the springs being broken away to disclose more clearly the mechanism for operating the work support; Fig. 2 is a detail view partly in section illustrating the means for providing the limited work releasing movement of the horn after its initial clamping movement.

In its illustrated preferred embodiment the invention is shown as applied to a manually operated machine for inserting previously formed fastenings in which the work is supported upon a horn and is more fully shown and described in my copending application Serial No. 488,031, filed April 5, 1909, of which application the present application is a division.

The machine comprises a base 2, a column 4 and a head 6, in which the fastening inserting mechanisms are carried. In the lower part of the frame or base 2 of the machine is fulcrumed at 5 a treadle lever 3, the end adapted to be engaged by the foot of the operator being maintained normally in its uppermost position by a spring 8 connected at one end to the treadle 3 and at its other end to the frame of the machine, this spring being shown broken away in Fig. 1 to disclose more clearly the parts behind it.

Pivoted at 10 in the base 2 are two levers 12 and 14 having opposed sockets in which are confined respectively the opposite ends of a spring 16 through which yielding pressure is brought to bear upon the work supporting means hereinafter to be described. The levers 12 and 14 have limited relative movement in both directions, the amount of movement in the spring compressing direction being determined by the distance apart of the outer portion of the spring sockets in said levers, and the amount of relative separating movement of said levers being determined by the engagement of an arm 18 upon the lever 12 with a stop 20 upon the lever 14. The lever 14 is provided with a downwardly extending cam 22 which is engaged by a cam roll 24 on the treadle 3, said cam 22 extending through a central slot in said treadle lever so that as said treadle is depressed the lever 14 will be rocked upwardly about the pivot 10, thus through the spring 16 tending to rock the lever 12 likewise about the pivot 10.

At its outer end the lever 12 bears against the lower end of a horn shaft 26, which is guided in the guideways 28 of the machine frame and which carries at its upper end a horn 30 for supporting the work. The work is clamped between the horn and the head of the machine as the horn 30 is raised by the lever 14 as it is rocked upwardly about its pivot 10.

The means for providing a lesser movement of the horn for work feeding purposes between successive fastening inserting operations comprises a locking pawl 34 arranged to coöperate with ratchet teeth 36 upon one side of the horn shaft 26, said shaft being prevented from turning by a pin 28 bearing against a slab-sided portion of the shaft in the guideway extension of the frame of the machine.

The pawl 34 is provided with a vertical slot 35 which receives a pivot 40 about which the pawl may turn from its locking to its releasing position and vice versa, and upon which it reciprocates vertically a distance determined by the length of the slot 35. A plunger 42 bearing upon a spring 44 in a socket in the pawl 34 tends normally to maintain the pawl in its uppermost position with the pivot 40 in engagement with the lower end of the slot 35. A handle 46 is provided by which the pawl 34 may be moved into its releasing position, this movement being limited by a stop 48. The plunger 42 also tends to move the pawl into locking engagement with the ratchet teeth 36 upon the horn shaft 26. The handle 46 of the pawl 34 provides means for releasing the pawl from engagement with the ratchet teeth 36.

The operation of the mechanism hereinabove described is as follows:—The horn being in work receiving position as shown in Fig. 1, the work into which the fastenings are to be inserted is placed upon the horn and the treadle lever 3 is then depressed. As the lever 3 is moved downwardly, the cam roll 24 will engage the cam upon the lever 14 and rock said lever upwardly about its pivot 10, thereby through the spring 16 turning the lever 12 also upwardly about the pivot 10, thus raising the horn shaft 26 and with it the horn 30 to clamp the work against the work abutment surrounding the driver passage. As the horn shaft 26 is moved upwardly the ratchet teeth 36 will pass by the pawl 34 until the work is clamped against the work abutment, the pawl being at this time held at the upper limit of its movement by the spring pressed plunger 42 and when the work is clamped the pawl will be engaged with that one of the teeth 36 which corresponds in position upon the horn shaft to the thickness of the work clamped. After the first nail has been driven and the operator has permitted the treadle 3 to rise under the action of the spring 8 preparatory to driving a second nail, the horn shaft 26 will move downwardly under the action of gravity carrying with it the pawl 34 and compressing the plunger operating spring 44. Only a limited amount of downward movement of the horn shaft will be permitted at this time since the pivot 40 will engage the upper end of the slot 35 in the pawl and prevent further downward movement. This movement will, however, be sufficient to release the work to permit it to be fed over the horn by the operator. After the nailing has been completed, the operator will grasp the handle 46 and move the pawl out of engagement with the ratchet teeth 36, thereby permitting the horn shaft and horn to drop to their lowermost positions so that the work may be readily removed.

Having now fully described my invention what I claim as new and desire to secure by Letters Patent of the United States is:—

1. In a machine of the class described, a work support normally in work receiving position and movable manually into work clamping position and automatic means acting when the manual control is released to prevent the return of said work support beyond a point intermediate between its work clamping and work receiving positions after it has received its initial work clamping movement.

2. In a machine of the class described, a work support movable between work receiving and work clamping positions, manually operated means for moving said support yieldingly into work clamping position and automatic means acting when the manual control is released to prevent the return of said work support beyond a point intermediate between its work receiving and work clamping positions after its initial movement into work clamping position.

3. In a machine of the class described, a work support normally in work receiving position and movable manually into work clamping position and means acting automatically when the manual control is released to prevent the return of said support beyond a point intermediate between said positions after the initial movement into work clamping position, said means being arranged to travel with said support to permit and to determine a limited reciprocating movement of said support.

4. In a machine of the class described, a work support movable manually between work receiving and work clamping positions, and automatic means acting when the manual control is released to prevent the return of said support beyond a point intermediate between said positions after its initial clamping movement arranged to be rendered inoperative by the operator when it is desired to remove the work from said support.

5. In a machine of the class described, a work support movable manually between work receiving and work clamping positions, and automatic means acting when the manual control is released to prevent the return of said support beyond a point intermediate between said positions after its initial clamping movement, said means being arranged to be rendered inoperative by the operator when it is desired to remove the work from said support and being constructed to permit a predetermined releasing movement of said support for work feeding purposes.

6. In a manually operated machine for inserting fastenings into work moved into successive fastening receiving relations to said machine, a work support movable between a work receiving position and a position in which it sustains the work for the fastening inserting operation, means whereby the beginning of the manual operation of said machine effects a movement of the work support into work sustaining position, said means acting during the operation of the machine to maintain said work support in said position, and means acting automatically to positively prevent the return of the work support into work receiving position when the manually controlled parts are moved into position for a succeeding operation, said means being constructed to permit a predetermined return to release the work for feeding.

7. In a machine of the class described, a work support movable between a work receiving position and a work clamping position, and means for automatically preventing the return of said support beyond a point intermediate between said positions after the initial movement into work clamping position comprising a ratchet upon said work support and a pawl having a limited vertical movement spring-pressed normally into engagement with said ratchet and yieldingly maintained normally at the upper limit of its vertical movement.

In testimony whereof I have signed my name to this specification in the presence of two subscribing witnesses.

GEORGE GODDU.

Witnesses:
CHESTER E. ROGERS,
LAURA M. GOODRIDGE.

Copies of this patent may be obtained for five cents each, by addressing the "Commissioner of Patents, Wasnington, D. C."